United States Patent [19]

Nakayama et al.

[11] Patent Number: 4,673,602
[45] Date of Patent: Jun. 16, 1987

[54] COMPOSITE SUBSTRATE PLATE FOR MAGNETIC OR OPTICAL DISK AND PROCESS FOR PRODUCTION THEREOF

[75] Inventors: Syoichi Nakayama, Yokohama; Keita Inui, Tsu; Setsuo Suzuki, Yokohama, all of Japan

[73] Assignee: Sumitomo Bakelite Company Limited, Tokyo, Japan

[21] Appl. No.: 741,489

[22] Filed: Jun. 5, 1985

[30] Foreign Application Priority Data

| Jun. 13, 1984 | [JP] | Japan | 59-119939 |
| Jun. 13, 1984 | [JP] | Japan | 59-119940 |
| Jul. 31, 1984 | [JP] | Japan | 59-159153 |
| Oct. 12, 1984 | [JP] | Japan | 59-212659 |
| Oct. 15, 1984 | [JP] | Japan | 59-214237 |
| Oct. 18, 1984 | [JP] | Japan | 59-217353 |
| Nov. 30, 1984 | [JP] | Japan | 59-251675 |
| Nov. 30, 1984 | [JP] | Japan | 59-251677 |

[51] Int. Cl.$^4$ .................. G11B 23/42; G11B 7/24
[52] U.S. Cl. .................... 428/65; 369/288; 428/215; 428/221; 428/414; 428/416; 428/418; 428/423.1; 428/423.5; 428/425.8; 428/458; 428/694; 428/900; 430/945
[58] Field of Search ............ 428/65, 221, 414, 416, 428/418, 423.1, 423.5, 425.8, 458, 215, 694, 900; 430/945; 369/288

[56] References Cited

U.S. PATENT DOCUMENTS

| 4,250,219 | 2/1981 | Pogoda | 428/423.5 |
| 4,300,143 | 11/1981 | Bell et al. | 430/945 |
| 4,407,880 | 10/1983 | Terao et al. | 428/416 |
| 4,423,427 | 12/1983 | Kaiser | 428/65 |
| 4,451,915 | 5/1984 | LaBudde et al. | 369/109 |
| 4,492,730 | 1/1985 | Oishi et al. | 428/418 |
| 4,547,876 | 10/1985 | Ettenberg | 369/275 |
| 4,555,716 | 11/1985 | Odawara et al. | 428/65 |
| 4,571,314 | 2/1986 | Suzuki et al. | 428/414 |
| 4,576,896 | 3/1986 | Suzuki et al. | 430/945 |
| 4,592,939 | 6/1986 | Temple et al. | 428/65 |
| 4,598,017 | 7/1986 | Bayer et al. | 428/416 |

FOREIGN PATENT DOCUMENTS

| 16937 | 2/1981 | Japan . |
| 88503 | 6/1982 | Japan . |
| 160843 | 9/1984 | Japan . |
| 2105094 | 3/1983 | United Kingdom . |

Primary Examiner—George F. Lesmes
Assistant Examiner—William M. Atkinson
Attorney, Agent, or Firm—Browdy and Neimark

[57] ABSTRACT

A composite substrate plate for a magnetic or optical disk, comprising a metal plate, an undercoat resin layer formed on one side or both sides of said metal plate, and a surface resin layer having a mirrorlike surface formed on said undercoat resin layer. Such a composite substrate plate is obtained by placing a liquid resin for forming the surface resin layer on the undercoat resin layer formed on one side or both sides of said metal plate or, alternatively, on one or two mirror-finished surfaces of molding plates for imparting a mirrorlike surface to said surface resin layer, then assembling the metal plate and the one or two molding plates so that one side or both sides of said metal plate carrying the undercoat resin layer and the liquid resin may be brought into contact with the one or two clean mirrorlike surfaces of molding plates or, alternatively, one side or both sides of said metal plate carrying the undercoat resin layer and no liquid resin may be brought into contact with the one or two liquid resin-bearing surfaces of molding plates, subsequently allowing the liquid resin to cure, and removing the one or two mirror-finished molding plates.

8 Claims, 8 Drawing Figures

COMPOSITE SUBSTRATE PLATE FOR MAGNETIC OR OPTICAL DISK AND PROCESS FOR PRODUCTION THEREOF

This invention relates to a substrate plate for use in a magnetic or optical disk (including a magnetooptical disk), comprising a synthetic resin and a metal plate in composite structure and excellent in mirrorlike smoothness of the surface and rigidity.

A rigid magnetic disk is generally believed to be promising as a computer backup memory in view of cost and storage capacity and now becoming a device in actual use.

As a substrate plate for the rigid magnetic disk, use is now being made of chiefly an aluminum plate, upon the surface of which a magnetic layer is formed to produce a rigid magnetic disk. In order to increase the capacity of a rigid magnetic disk, it is said to be necessary to reduce the gap between the disk surface and a magnetic head, the gap being usually as small as about 0.3 μm or below. For this reason, the required precision for the surface conditions of the disk such as surface roughness and flatness becomes very strict. To comply with the requirements it is necessary to reduce the surface roughness of the substrate and improve the flatness by machining to produce a mirror-finished surface. Such machining, however, requires a large number of manhours for grinding, resulting in a high priced substrate plate relative to the material cost. As a means to produce an economical substrate plate, there has been proposed to make a metal-resin composite plate from a metal plate as a core material and a synthetic resin as a surface layer by injection molding using a mold by mirror surface finish. It has been difficult, however, to form a sufficiently thin surface resin layer by such a method, which produces merely a resin layer of considerable thickness. A resin-metal composite having a considerably thick resin layer has a defect of being prone to adhesion failure between a resin and a metal different in their thermal expansion coefficients, which is caused by various treatments (heating, cooling, repeated rapid heating and cooling, and treatments at high temperatures and high humidities) during the subsequent formation of a magnetic layer. As for an optical disk, there is also required a substrate plate subject to little deformation against changes in temperature and humidity of the environment or during formation of a functional layer.

A substrate plate of a resin alone is of insufficient reliability in the above-noted respects and a higher rigidity and a higher heat resistance are required. Accordingly, there has been made a proposal of a construction such that a metal plate provided with a functional layer is disposed at the center, around which a spacer of a certain thickness is arranged and a transparent cover disk is provided as the surface layer. However, polymethyl methacrylate (PMMA) resin generally used in a videodisk or the like is unsatisfactory in heat resistance (about 60° C.) and unreliable in forming a functional layer (at about 80° C.) or in long term use. Therefore, there is a demand for a substrate plate having a better heat resistance. Furthermore, an optical disk is operated at a high revolution to improve the storage capacity and to reduce the access time. As a consequence, PMMA resin reveals an important defect such that an outward cold flow takes place due to the centrifugal force.

A glass substrate plate has also disadvantages in that the initial access time is prolonged due to the high specific gravity of the glass and that a high speed revolution is difficult because of the fragility of glass.

In order to solve the foregoing problems there is a demand for a substrate plate which is excellent in heat resistance, not susceptible to cold flow, and excellent in dimensional stability.

The primary object of this invention is to provide a composite substrate plate for a magnetic or optical disk, which is excellent in mirrorlike surface, rigidity, and heat resistance, comprising a metal plate excellent in rigidity and heat resistance and a synthetic resin capable of forming a mirrorlike surface which are brought into a composite structure.

According to this invention, there is provided a composite substrate plate for a magnetic or optical disk, which comprises, as shown in FIG. 1 or 2, a metal plate (1), an undercoat resin layer (2) formed on one side or both sides of said metal plate, and, formed thereon, a surface resin layer (3) having a mirrorlike surface (3a) and there is also provided a method for producing such a composite substrate plate.

As the metal plate (1) in this invention, use is made of an aluminum plate or a steel plate. The surface (1a) of the metal plate (1) is preferably roughened by coarse grinding with a sandpaper or by dry or wet blasting, a treatment in which finely powdered walnuts, metals, and glass are forced to collide violently with the surface. The roughening of metal surface promotes the adhesion of the undercoat resin by anchoring in the uneven metal surface. A surface roughness corresponding to $R_{max}$ of about 6.5–10 μm is suitable. The roughening of metal surface together with the effect of the undercoat layer serves to improve the adhesion of the surface layer and the metal plate, and to improve markedly the crack resistance of the surface layer.

The undercoat resin layer (2) is provided on the roughened surface of metal plate (1). The undercoat resin should be excellent in the adhesiveness to both the metal plate and the surface resin layer, and a resin having, in addition, flexibility is favorable for the improvement in crack resistance. The undercoat resins generally used in this invention are thermosetting or photosetting resins of the liquid or solution type, particularly epoxy resins and urethane resins.

In making a rigid magnetic or optical disk, the formation of a magnetic layer or a functional layer on the surface of a substrate plate is generally carried out under an atmosphere of 150° C. or above. Therefore, the undercoat resin is required to be sufficiently high in heat resistance and adhesiveness to both the metal plate and the surface resin layer. For this reason, epoxy resins are preferred. An epoxy resin having a suitable flexibility is most preferred, because the undercoat layer disposed between a metal plate and a surface layer is responsible for the absorption of mechanical stress created between the metal plate and the surface layer by heating. Bisphenol-type epoxy resins having a good heat resistance in addition to desirable flexibility are used in this invention as a major constituent of the undercoat resin, and those having a molecular weight of 500 to 1000 (250 to 500 in epoxy equivalent) are preferred. Suitable curing agents in such an epoxy resin composition are imidazole compounds and dicyandiamide compounds.

The thickness of an undercoat resin layer should be in the range of from 5 to 200 μm. If the thickness is below 5 μm, the undercoat resin layer is not effective and, moreover, there occurs adhesion failure between the metal plate and the surface resin layer in forming the latter layer. If the thickness exceeds 200 μm, the dimension of the substrate plate, particularly the precision of thickness, tends to become inferior after heat treatment. A preferable thickness is in the range of from 10 to 50 μm. When the thickness of the undercoat layer is in such a range, the adhesion between the surface resin layer and the metal plate is especially good and the precision of the thickness of the composite substrate plate is also satisfactory. In applying the undercoat a technique of spray or spinner coating can be used.

The surface resin layer (3) has a mirrorlike surface (3a) imparted by the mirror-finished surface of a molding plate as described later. The resin which forms the surface layer is required to be excellent in spreadability, capable of exhibiting a glass transition point as high as possible after curing, excellent in durability, small in shrinkage due to curing, and excellent in adhesion to the undercoat resin. Resins which can meet such requirements are rigid curable resins; particularly preferred are epoxy resins, imide resins, urethane resins, and mixtures thereof. Of these resins, epoxy resins of any type are useful. In practice, epoxy resins are used in this invention in the form of an epoxy resin composition comprising epoxy resins, acid anhydride curing agents, amine-type curing accelerators, and, if necessary, antioxidants and light stabilizers. Among such compositions, especially preferred is a three-dimentionally crosslinkable liquid composition comprising a cycloaliphatic epoxy resin, an organic polybasic acid anhydride, and a curing accelerator.

The thickness of the surface resin layer is 5 to 500 μm, preferably 10 to 100 μm. If the thickness is below 5 μm, the precision of thickness becomes inferior and the heat resistance of the resin is not fully exhibited, whereas if it exceeds 500 μm, the layer becomes excessively thick, wasting the resin, and susceptible to cracking caused by a repeated heating and cooling test.

As the cycloaliphatic epoxy resins, there may be used dicyclopentadiene dioxide, vinylcyclohexene dioxide, limonene dioxide, 3,4-epoxy-6-mathylcyclohexyl-methyl-3,4-epoxy-6-methylcyclohexanecarboxylate, bis(3,4-epoxy-6-methylcyclohexylmethyl) adipate, bis(2,3-epoxycyclopentyl) ether, ethylene glycol bis(3,4-epoxyhexahydrobenzylcarbonate), bis(2,3-epoxydicyclopentadienyl) ether, 2,4-epoxy-dicyclopentadienyl-3,4-epoxycyclohexyl ether and the like. These are used each alone or in combinations.

As the curing agents, there may be used organic acid anhydrides so long as they are sufficiently compatible with the cycloaliphatic epoxy resins. Those especially preferred from the viewpoint of weather resistance are aliphatic or cycloaliphatic acid anhydrides such as hexahydrophthalic anhydride, tetrahydrophthalic anhydride, methyltetrahydrophthalic anhydride, endomethylenetetrahydrophthalic anhydride, and polyazelaic anhydride. These are also used in suitable admixture with unsaturated aliphatic acid anhydrides or aromatic acid anhydrides such as maleic anhydride, phthalic anhydride, trimellitic anhydride, and pyromellitic anhydride.

Desirable curing accelerators include imidazoles such as 2-ethyl-4-methylimidazole, 2-methylimidazole, and 1-benzyl-2-methylimidazole; tertiary amines such as 1,8-diazabicycloundecane, and the salt of 2-ethylhexylcarboxylic acid with 1,8-diazabicyclo(5,4,0-undecene-7).

For the purpose of preventing the cured resin from deterioration, antideterioration agents are generally added. As such agents, mention may be made of hindered phenols such as 2,6-di-tert-butyl-p-cresol and 2-allyl-6-propyl-p-cresol; organic sulfides, organic phosphites, and salts of higher aliphatic acids. These compounds are used each alone or in combinations. The joint use of above compounds is very effective for the prevention of cured resins from deterioration especially at high temperatures.

If necessary, various inorganic fillers may be added for the purpose of improving the cured resin in thermal conductivity and surface hardness or reducing the thermal expansion coefficient of the cured resin.

When an imide resin is used to form the surface resin layer, it is applied inevitably in the form of solution. After the resin solution is coated on the metal plate and the solvent has been evaporated, the coating is heated to form the surface resin layer. Therefore, upon heating, the resin should flow and become formable. For this reason, a varnish made by dissolving a meltable polyaminobismaleimide resin in a solvent is preferentially used. A varnish comprising said resin and a normally solid epoxy resin is useful to decrease the curing temperature. In this case, a desirable mixing ratio of epoxy resin to polyaminobismaleimide resin is in the range of 50:100 or less by weight. If the ratio is larger than 50:100, the heat resistance of the surface layer becomes declined, rendering the substrate plate unsuitable for practical use.

The procedure of making the substrate plate for a magnetic or optical disk is described hereunder.

In a method for making a composite substrate plate comprising a metal plate (1) bearing on one side an undercoat resin layer (2) and a surface resin layer (3) formed on said undercoat resin layer as shown in FIG. 1, an appropriate amount of a liquid resin (3') is placed on the surface of said undercoat resin layer (2) formed on said metal plate (1) as shown in FIG. 3 [or, alternatively, on the mirrorlike surface (4a) of a mirror-finished molding plate (4)] [(5) is a lower platen], then a mirror-finished molding plate (4) is placed on the metal plate (1) so that the mirror-finished surface (4a) may face the metal plate, and a pressure is applied, whereby a thin layer of the liquid resin (3) is formed on the undercoat resin layer (2) (FIG. 4); the liquid resin (3) is allowed to cure in this condition, and then the mirror-finished molding plate (4) is removed to leave behind a composite substrate plate bearing a surface resin layer with mirrorlike surface (3a), which is formed on one side of the metal plate (1).

In providing a surface resin layer (3) on both sides of metal plate (1) as shown in FIG. 2, a liquid resin (3') is placed on the undercoat resin layer (2) formed on both sides of metal plate (1) [or, alternatively, on each mirrorlike surface (4a) of two mirror-finished molding plates (4)], then said metal plate (1) is placed between two mirror-finished molding plates (4) (FIG. 5), and the liquid resin (3) is allowed to cure under application of pressure (FIG. 6); thereafter the mirror-finished molding plates (4) are removed leaving behind a composite substrate plate with a surface resin layer having a mirrorlike surface formed on both sides of metal plate (1).

In feeding a liquid resin onto the undercoat resin layer provided on one or both sides of a metal plate or onto one or more mirror-finished molding plates, the resin having a suitable viscosity is thoroughly deaerated and a slight excess thereof is applied by hand coating or spin coating. A suitable viscosity of the resin is in the range of 50 to 10,000 cp. In assembling a metal plate carrying the liquid resin and molding plates, caution should be taken to keep air from being trapped within the liquid resin or between the resin and the molding plates or the metal plate. The liquid resin is allowed to cure under a pressure applied by the weight of an upper molding plate or an additional weight put on the molding plate or by other means. The liquid resin is cured generally by heating.

In a manner as described above, there is obtained a composite substrate plate comprising a metal plate carrying on one or both sides thereof a thin surface layer having a uniform thickness and a mirrorlike surface. The surface resin layers formed on both sides of a metal plate have the same thickness, which is usually 5 to 200 $\mu$m. The flash of the excess of resin applied to form the surface resin layer is removed by post-machining.

In order to strictly adjust the thickness of a composite substrate plate, it is possible to interpose spacers (7) for thickness adjustment between upper mirror-finished molding plate (4) and lower platen (5) or between upper and lower mirror-finished molding plates (4), as shown in FIGS. 7 or 8. The spacers can be fixed to an upper or lower plate or simply placed on a lower plate.

When a substrate plate for use in a writeonce and erasable (magnetooptics type and phase transfer type) optical disk is required, a guide pregroove for the signal recording can be formed on one side of the mirrorlike surface composite substrate plate by using, in place of the mirror-finished molding plate (4) in FIG. 3, a metal stamper reinforced by backing, which bears the pregroove.

The present invention provides the following advantages:

(1) Since the mirrorlike surface of the mirror-finished molding plate is accurately transferred, the present composite substrate plate is excellent in surface precision. For instance, a surface roughness ($R_{max}$) of 0.025 $\mu$m or below is easily attained.

(2) The composite substrate plate has a uniform thickness, the precision being usually ±0.02 mm or less.

(3) When a metal plate of excellent flatness is used, surface resin layers formed on both sides thereof have the same and uniform thickness.

(4) The composite substrate plate obtained according to this invention is excellent in heat resistance of the surface resin layer and in adhesion between the metal plate and the surface resin layer.

(5) Therefore, the present substrate plate meets the requirements for the manufacture, use, and storage of a rigid magnetic or optical disk and, hence, is highly suitable for use in making such disks.

Figure 1:
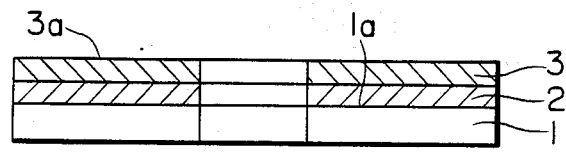
FIGS. 1 and 2 are sectional views of the present composite substrate plate comprising a metal plate, an undercoat resin layer formed on one or both sides of said metal plate, and a surface resin layer having a mirrorlike surface formed on said undercoat resin layer.
Figure 2:
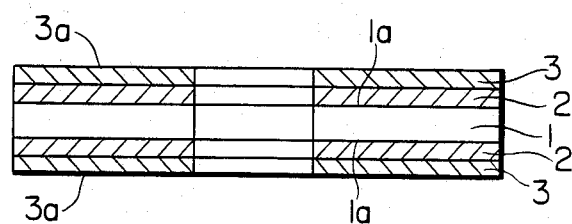
Figure 3:
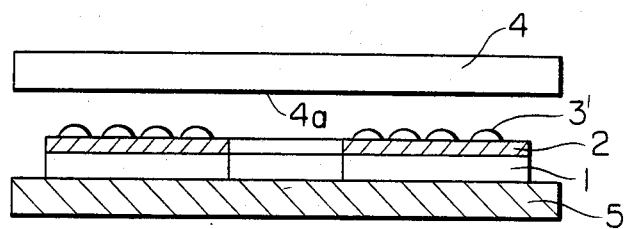
FIGS. 3 and 4 are sectional views illustrating the step of forming the surface resin layer, by means of a mirror-finished molding plate, on the undercoat resin layer provided on one side of the metal plate.
Figure 4:
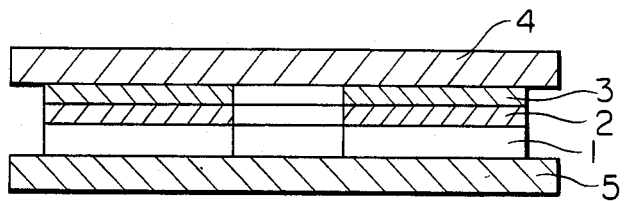
Figure 5:
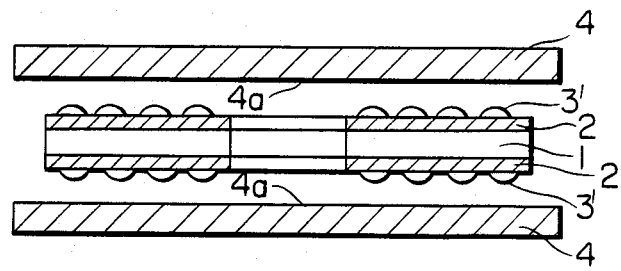
FIGS. 5 and 6 are sectional views illustrating the step of forming the surface resin layers, by means of mirror-finished molding plates, on the undercoat resin layers provided on both sides of the metal plate.
Figure 6:
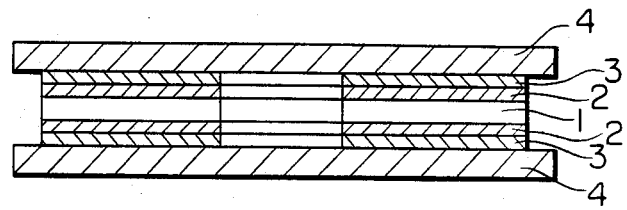
Figure 7:
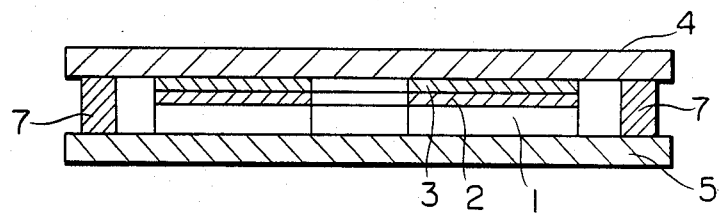
FIGS. 7 and 8 are sectional views illustrating the use of spacers for adjusting the thickness in the steps shown in FIGS. 4 and 6.
Figure 8:
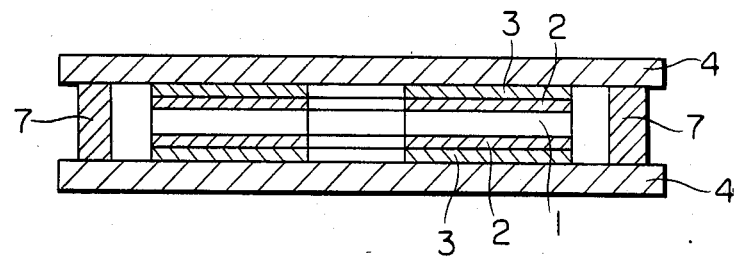

The invention is illustrated below in detail with reference to Examples, but the invention is not limited thereto.

EXAMPLE 1

An aluminum plate in the form of ring doughnut, 130 mm in outer diameter, 40 mm in inner diameter, and 1.7 mm in thickness, was used as the metal plate. Both sides of the aluminum plate were roughened to an $R_{max}$ of 8.0 $\mu$m by blasting finely powdered walnut shells by means of a blasting machine. After washing with a solvent, both roughened surfaces were each coated with an undercoat resin composition comprising a bisphenol-type epoxy resin (900 in molecular weight) and 2-ethyl-4-methylimidazole to a thickness of 40 $\mu$m. The coated aluminum plate was heated at 135° C. for one hour to cure the resin. The cured undercoat layers were each overcoated with 5 g of an epoxy resin composition of the undermentioned formulation. The resulting coated aluminum plate was placed together with several Teflon spacers between upper and lower molding plates having mirror-finished surfaces and subjected to a pressure of 100 g/cm$^2$ applied to the molding plates, said Teflon spacers, 1.9±0.01 mm in thickness, being posted at several positions surrounding the coated aluminum plate and near the edges of molding plates so that the thickness of each surface resin layer may become 60 $\mu$m.

|  | Parts by weight |
| --- | --- |
| Cycloaliphatic epoxy resin [(3,4-epoxycyclohexylmethyl)-3,4-epoxy-cyclohexanecarboxylate] | 100 |
| Methylhexahydrophthalic anhydride | 120 |
| 1,8-Diazabicyclo(5,4,0-undecene-2-ethylhexylcarboxylic acid salt | 3.5 |
| 2,6-Di-tert-butyl-p-cresol | 0.5 |

The molding plate used was a mirror-finished glass disk of a surface roughness ($R_{max}$) of 0.01–0.02 $\mu$m and a flatness of ±0.01 mm. The resulting assembly was heated in an oven at 130° C. for 2 hours to cure the resin. Upon removing the molding plates, there was obtained a composite substrate plate for a magnetic disk with surface resin layers of mirrorlike surfaces. The substrate plate showed the following characteristics:

| Thickness | 1.90 ± 0.02 mm |
| --- | --- |
| Surface roughness ($R_{max}$) | 0.01–0.02 $\mu$m |
| Flatness | ±0.01 mm |
| Repeated heating and cooling test (125° C., 30 min. ⟷ −40° C., 30 min.) | No problem after 50 cycles or more. |

The substrate plate was coated with a dispersion of 35% by weight of powdered $\gamma$-Fe$_2$O$_3$, 0.2 $\mu$m in particle size, in a vinyl chloride-vinyl acetate copolymer used as a binder, the thickness of the coating layer being 5 $\mu$m. The resulting magnetic layer showed a coercive force of 400 Oe.

EXAMPLE 2

In a manner similar to that in Example 1, an aluminum plate bearing on each side an undercoat resin layer of 40

μm in thickness was obtained. Each undercoat resin layer was overcoated with 10 g of a paste of the undermentioned formulation. The coated plate was dried at 80° C. to remove completely the solvent.

|  | Parts by weight |
| --- | --- |
| Bisphenol A type epoxy resin (900 in molecular weight) | 30 |
| Polyaminobismaleimide resin (powder) | 100 |
| Butyl Cellosolve (solvent) | 150 |

The dried coated plate together with spacers of 1.9±0.01 mm in thickness was disposed between the upper and lower mirror-finished molding plates as in Example 1, and heated at 150° C. for 4 hours to cure the resins. The molding plates were then removed, leaving behind a composite substrate plate for an optical disk provided with surface resin layers having mirrorlike surfaces, which showed the following characteristics:

| Thickness of substrate plate | 1.90 ± 0.02 mm |
| --- | --- |
| Surface roughness ($R_{max}$) | 0.01–0.02 μm |
| Flatness | ±0.01 mm |
| Repeated heating and cooling test (125° C., 30 min. ⟵⟶ −40° C., 30 min.) | No problem after 50 cycles or more |

On the composite substrate plate, was formed by the ordinary photopolymer method a beam guiding groove at a track pitch of 2.5 μm followed by successive gas-phase formation of a reflection aluminum layer of 2000 Å in thickness, a plasma-polymerized $CS_2$ layer of 1000 Å in thickness, an optical disk recording plasma-polymerized $CS_2$-TE layer of 250 Å in thickness, and a protective $SiO_2$ layer of 1000 Å in thickness, thereby to obtain an optical disk.

The recording characteristics of the optical disk were tested by using a semiconductor laser ($\lambda = 8200$ Å) under the conditions: laser spot size of 1.6 μmφ; writing power of 8 mW, reading power of 2 mW, and substrate plate revolution of 1800 rpm. It was found that the recording sensitivity was as good as 55 dB (1 MHz) in terms of C/N ratio.

EXAMPLE 3

A magnetooptical disk was prepared in the following manner from the composite substrate plate obtained in Example 2.

On the composite substrate plate, there was formed by the ordinary photopolymer method a beam guiding groove at a track pitch of 2.5 μm, followed by successive formation of a reflective aluminum layer of 2000 Å in thickness, a dielectric $SiO_2$ layer of 1400 Å in thickness, a magnetooptical recording $Tb_{26}Fe_{74}$ layer of 1000 Å in thickness, and a protective $SiO_2$ layer of 2000 Å in thickness thereby to obtain a magnetooptical disk. The recording characteristics of the rewritable magnetooptical disk thus obtained were tested by using a semiconductor laser ($\lambda = 8200$ Å) under the conditions: laser spot size of 1.0 μMφ, writing power of 8 mW, reading power of 2 mW; and disk revolution of 1000 rpm. It was found that the recording sensitivity was as good as 50 dB (1 MHz) in terms of C/N ratio.

COMPARATIVE EXAMPLE 1

A composite substrate plate was prepared in the same manner as in Example 1, except that the undercoat resin was not coated on the aluminum plate. This substrate plate showed the following characteristics:

| Thickness | 1.90 ± 0.02 mm |
| --- | --- |
| Surface roughness ($R_{max}$) | 0.01–0.02 μm |
| Flatness | ±0.01 mm |
| Repeated heating and cooling test (125° C., 30 min. ⟵⟶ −40° C., 30 min.) | Cracking observed in resin layer after one cycle. |

Another composite substrate plate was made by using spacers of 1.80±0.01 mm in thickness to adjust the thickness of surface resin layer to 50 μm. This substrate plate showed also cracking in the resin layer after 1 cycle of heating and cooling test.

The composite substrate plates obtained above were both unsuitable for use in a magnetic disk or an optical disk.

COMPARATIVE EXAMPLE 2

The aluminum plate bearing an undercoat resin layer on each side thereof obtained in Example 1 was mounted in a mold [surface roughness ($R_{max}$): 0.01–0.02 μm] for injection molding. An epoxy resin composition of the following formulation, which had been mixed by melting together, was injected at a low pressure into the mold to form a surface resin layer of 60 μm in thickness on each side of the undercoated aluminum plate.

|  | Parts by weight |
| --- | --- |
| Bisphenol-A type epoxy resin (900 in molecular weight) | 100 |
| Methylhexahydrophthalic anhydride | 90 |
| DMP-30 | 2 |

The composite substrate plate taken out from the mold showed nonuniform flow of the resin composition over the undercoat layer, and a sink mark was observed on the portion opposite to the gate, indicating the unsuitableness for use in a magnetic or optical disk.

What is claimed is:

1. A magnetic or optical recording disc composite substrate plate comprising a metal plate, an undercoat resin layer formed on one side or both sides of said metal plate, and a surface resin layer having a microscopically smooth surface formed on said undercoat resin layer, said undercoat resin layer having a thickness of 5–200 microns and comprising a cured resin which is more flexible than said surface resin layer, and said surface resin layer having a thickness of 5–500 microns.

2. A composite substrate plate according to claim 1, wherein the metal plate is roughened on the one side or both sides thereof.

3. A composite substrate plate according to claim 1, wherein the surface resin layer comprises a cured product of epoxy resin, imide resin, urethane resin, or a mixture of two or more of these resins.

4. A composite substrate plate according to claim 3, wherein the epoxy resin is a resin composition comprising a cycloaliphatic epoxy resin and an acid anhydride curing agent as major constituents.

5. A composite substrate plate according to claim 4, wherein the undercoat resin layer comprises a bisphenol-A type epoxy resin cured with dicyandiamide and/or an imidazole compound.

6. A composite substrate plate according to claim 3, wherein the imide resin comprises polyaminobismaleimide as a major constituent.

7. A composite substrate according to claim 6, wherein the undercoat resin layer comprises a bisphenol-A type epoxy resin cured with dicyandiamide and/or an imidazole compound.

8. A magnetic or optical recording disc having a composite substrate plate, said substrate comprising a metal plate, an undercoat resin layer formed on one side or both sides of said metal plate, and a surface resin layer having a microscopically smooth surface formed on said undercoat resin layer, said undercoat resin layer having a thickness of 5-200 microns and comprising a cured resin which is more flexible than said surface resin layer, and said surface resin layer having a thickness of 5-500 microns.

* * * * *